United States Patent [19]

Postupack et al.

[11] 4,259,371
[45] Mar. 31, 1981

[54] METHOD FOR IMPROVING THE ALKALI DURABILITY OF METAL OXIDE FILMS FORMED BY PYROLYSIS

[75] Inventors: Dennis S. Postupack, Natrona Heights; John F. Sopko, Trafford, both of Pa.

[73] Assignee: PPG Industries, Inc., Pittsburgh, Pa.

[21] Appl. No.: 60,318

[22] Filed: Jul. 25, 1979

[51] Int. Cl.$^3$ ............................................. B05D 3/02
[52] U.S. Cl. ................................... 427/226; 65/60 D; 427/314; 427/427
[58] Field of Search ...................... 427/226, 427, 314; 65/60 D

[56] References Cited

U.S. PATENT DOCUMENTS

| | | | |
|---|---|---|---|
| 3,660,061 | 5/1972 | Donle et al. | 65/60 D |
| 3,689,304 | 9/1972 | Bamford | 427/226 |
| 3,952,118 | 4/1976 | Novice et al. | 427/226 |

Primary Examiner—Ronald H. Smith
Assistant Examiner—Janyce A. Bell
Attorney, Agent, or Firm—Donna L. Seidel

[57] ABSTRACT

A method is disclosed for improving the uniformity and durability of a pyrolytically deposited metal oxide film on glass by cooling the coating solution and/or the atomizing air prior to the application of the coating composition to the hot glass surface.

5 Claims, No Drawings

METHOD FOR IMPROVING THE ALKALI DURABILITY OF METAL OXIDE FILMS FORMED BY PYROLYSIS

BACKGROUND OF THE INVENTION

1. Field of the Invention

The present invention relates generally to the art of depositing metal oxide films on glass substrates, and more particularly, to the art of depositing such metal oxide films by contacting a hot glass surface in an oxidizing atmosphere with a coating composition cable of pyrolysis upon contact with the hot glass surface to form a metal oxide.

2. The Prior Art

U.S. Pat. No. 3,660,061 to Donley et al teaches a method for depositing metal oxide films by applying a solution of a metal oxide film forming composition in an oxidizing atmosphere to a surface of a newly formed flat glass ribbon while the surface is at a temperature sufficiently high to pyrolyze the composition to form a metal oxide film. The superior durability of metal oxide films so formed, as measured by salt spray exposure, is believed to be due to the presence of tin vapor over the bath which depsoits on the upper surface of the ribbon and at least part of which is believed to oxidize immediately upon exposure to the oxidizing atmosphere of the coating station. It is disclosed that, in general, films produced at lower glass temperatures are less durable.

SUMMARY OF THE INVENTION

In accordance with the present invention, the alkali durability of metal oxide films produced by known pyrolytic techniques of the prior art, wherein a solution of a thermally decomposable organometallic compound is sprayed onto a hot glass surface, is improved by decreasing the temperature of the solution. The alkali durability may be improved, from complete film removal to no attack upon exposure of a coated substrate to a 5.0 normal solution of sodium hydroxide at 200° F. (about 93° C.) for 30 minutes, by lowering the solution temperature to about 50° to 65° F. (about 10° to 18° C.), a point near supersaturation of the solution. Similar durability improvement may be achieved by lowering the temperature of the air used to atomize the solution to form a spray.

DESCRIPTION OF THE PREFERRED EMBODIMENTS

In a typical float glass operation, a continuous ribbon of glass is preferably drawn along the surface of a bath of molten metal, generally tin or a tin-containing alloy, contained in a reducing atmosphere consisting primarily of nitrogen and hydrogen. When the glass is cooled and hardened sufficiently to form a dimensionally stable configuration, but while the temperature is still sufficiently high to pyrolyze a thermally decomposable organometallic compound, the surface of the glass is contacted with a solution of a thermally decomposable metal compound according to methods found in the prior art. Preferably the coating technique described in U.S. Pat. No. 3,660,061 to Donley et al, which is incorporated herein by reference, is employed.

Various metal compounds of the prior art can be used according to the present invention. Such metal salts include acetates, 2-ethyl hexoates and acetyl acetonates of a wide variety of metals including copper, chromium, manganese, nickel, cobalt, iron, tin, titanium, vanadium, and mixtures thereof. The coating reactants are dissolved in suitable solvents to form a liquid coating composition.

Preferred solvents include aliphatic and olephinic halocarbons and halogenated hydrocarbons such as methyl bromide, carbon tetrachloride, chloroform, bromoform, trichloroethane, perchloroethylene, hexachloroethane, tetrachloroethane and preferably methylene chloride. The coating composition is preferably stored under pressure in an enclosed system and delivered to the spray guns through conduits insulated from the hot environment of the coating station. The solution is applied from the spray gun at a fairly rapid velocity toward the glass ribbon and traverses a relatively short distance to contact the glass. Nonetheless, the solution temperature increases substantially and significant evaporation occurs prior to application of the solution according to this method.

According to the present invention, the coating solution is initially chilled to a temperature of about 60° F. and is then transported to a spray gun through double walled tubing. In a particularly preferred embodiment, $\frac{3}{8}$ inch nylon tubing inside $\frac{5}{8}$ inch nylon tubing is used to transport the solution to the spray gun. The solution flow through the inner tube, while cool water flows in the annular space between the tubes to maintain the solution temperature. In addition, when the solution is to be sprayed onto the surface of a glass ribbon, the air used to atomize the coating solution may be similarly chilled.

In a most preferred embodiment of the invention, both the coating solution and the atomizing air are cooled to a temperature of about 60° F. (about 16° C.), and the delivery lines to the spray guns are insulated in order to maintain a temperature below about 80° F. (about 27° C.), until the solution and atomizing air reach the spray guns. Prior to the use of chilling according to the present invention, temperatures often reached upwards of 105° F. (about 41° C.).

The present invention will be further understood from the description of an example which follows.

EXAMPLE I

A coating composition is prepared comprising by weight 12.55 parts cobalt acetyl acetonate, 3.14 parts iron acetyl acetonate and 4.21 parts chromium acetyl acetonate containing a total metal content of 2 percent by weight as prepared in a solvent comprising equal volumes of methylene chloride and trichlorethane. The solution is kept in a pressurized solution tank equipped with a fluid pressure regulator and flow meter. As needed, the coating solution is supplied through an insulated conduit which leads to a chiller, consisting of stainless steel tubing which carries the coating solution through an outer shell of large diameter pipe which carries cold water to chill the solution to a temperature of about 65° F. (about 18° C.). The solution is then carried to spray guns through double walled tubing wherein solution flows through the inner tube and water flows through the annular space between the tubes to keep the solution cool. The tubing connects to a union which distributes the coating solution to spray guns through double walled conduits. The annular spaces of the conduits contain air to further isolate the solution from the hot environment prior to delivery to the spray gun.

The spray guns are supplied with air to atomize the coating solution prior to delivery to the hot glass surface. The atomizing air line is also passed through the chiller to cool the air temperature to about 60° F. (about 16° C.). The conduit carrying the atomizing air is surrounded by a copper tube which carries cold water to keep the air at about 60° F. (about 16° C.) as it is delivered to the spray gun.

The atomized coating solution is then applied to the hot glass surface where the coating reactants are pyrolyzed to form a metal oxide film on the glass.

The scope of the invention is defined by the following claims.

We claim:

1. In a method for depositing a metal oxide coating on glass by contacting a hot glass surface with a solution of a thermally decomposable metal compound at a temperature sufficient to pyrolyze the compound to form a metal oxide, the improvement which comprises cooling the solution to a temperature of about 50° to 65° F. (about 10° to 18° C.) prior to delivery to the hot glass.

2. The method according to claim 1 wherein the solution is atomized with air and sprayed onto the hot glass surface.

3. The method according to claim 2 wherein the components of the coating apparatus are sufficiently insulated so that the cooled solution arrives at a spray gun at a temperature below about 80° F. (about 27° C.).

4. In a method for depositing a metal oxide coating on glass by contacting a hot glass surface with an air atomized solution of a thermaly decomposable metal compound at a temperature sufficient to pyrolyze the compound to form a metal oxide, the improvement which comprises cooling the atomizing air to a temperature of about 50° to 65° F. (about 10° to 18° C.) prior to delivery to the hot glass.

5. The method according to claim 4, wherein the components of the coating apparatus are sufficiently insulated so that the atomizing air arrives at a spray gun at temperature below about 80° F. (about 27° C.).

* * * * *